United States Patent
Divakaruni

(10) Patent No.: US 8,059,754 B2
(45) Date of Patent: Nov. 15, 2011

(54) SYSTEM AND METHOD FOR FAST SIGNAL ACQUISITION IN A WIRELESS DIGITAL RECEIVER FOR WIDEBAND SIGNALS

(75) Inventor: Sasikala Divakaruni, Weston, FL (US)

(73) Assignee: XG Technology, Inc., Sarasota, FL (US)

( * ) Notice: Subject to any disclaimer, the term of this patent is extended or adjusted under 35 U.S.C. 154(b) by 907 days.

(21) Appl. No.: 11/881,614

(22) Filed: Jul. 27, 2007

(65) Prior Publication Data

US 2008/0025441 A1    Jan. 31, 2008

Related U.S. Application Data

(60) Provisional application No. 60/833,950, filed on Jul. 28, 2006.

(51) Int. Cl.
*H03K 9/00* (2006.01)
*H04L 27/00* (2006.01)

(52) U.S. Cl. ........................................................ 375/316

(58) Field of Classification Search .................. 375/225, 375/284, 316, 326, 330, 336, 342, 343, 366; 370/208, 335, 342, 350, 442, 503, 510
See application file for complete search history.

(56) References Cited

U.S. PATENT DOCUMENTS

| | | | | |
|---|---|---|---|---|
| 5,255,292 A * | 10/1993 | LaRosa et al. | ................ | 375/368 |
| 5,768,305 A * | 6/1998 | Kanda | ............................ | 375/150 |
| 6,272,194 B1 * | 8/2001 | Sakamoto | ..................... | 375/368 |
| 6,934,327 B1 * | 8/2005 | Whited et al. | .................. | 375/225 |
| 6,980,617 B1 * | 12/2005 | Shimawaki | ................... | 375/368 |
| 2005/0089083 A1 * | 4/2005 | Fisher et al. | .................. | 375/130 |
| 2005/0220229 A1 * | 10/2005 | Goto | ............................. | 375/343 |

* cited by examiner

*Primary Examiner* — David Payne
*Assistant Examiner* — Syed Haider
(74) *Attorney, Agent, or Firm* — Dennis L. Cook, Esq.

(57) ABSTRACT

A receiver synchronization technique is described in this disclosure that significantly reduces the convergence time for synchronization further enabling specially modulated radio frequency carrier waves using the following steps: the characteristics of the baseband signal are used to detect the start of a received burst. Once the presence of a symbol is detected, the data acquisition subsystem is enabled to begin collecting samples. These samples are then transferred to the DSP. The DSP then searches for a preamble to precisely determine the timing delay to the start of the payload data.

4 Claims, 3 Drawing Sheets

SYSTEM AND METHOD FOR FAST SIGNAL ACQUISITION IN A WIRELESS DIGITAL RECEIVER FOR WIDEBAND SIGNALS

CROSS-REFERENCE TO RELATED APPLICATION

The present application claims the benefit of previously filed Provisional Patent Application, Ser. No. 60/833,950 filed Jul. 28, 2006.

FIELD OF THE INVENTION

This invention addresses the need to transport high bit-rate data over wired or wireless means using specially modulated radio frequency carrier waves. Specifically, a receiver synchronization technique is described in this disclosure that significantly reduces the convergence time for synchronization further enabling specially modulated radio frequency carrier waves.

BACKGROUND OF THE INVENTION

Modulation is the fundamental process in any communication system. It is a process to impress a message (voice, image, data, etc.) on to a carrier wave for transmission. A band-limited range of frequencies that comprise the message (baseband) is translated to a higher range of frequencies. The band-limited message is preserved, i.e., every frequency in that message is scaled by a constant value, and then transmitted by a transmitter. The three key parameters of a carrier wave are its amplitude, its phase and its frequency, all of which can be modified in accordance with an information signal to obtain the modulated signal. The receiver then must select the correct transmitted signal from all the signals being transmitted by other transmitters in the area, and demodulate the signal using the same parameters the baseband signal was modulated with.

There are various shapes and forms of modulators and demodulators. For example conventional Amplitude Modulation uses a number of different techniques for modulating and demodulating the amplitude of the carrier in accordance with the information signal. These techniques have been described in detail in "Modern Analog and Digital Communication Systems" by B. P. Lathi. Similarly conventional Frequency/Phase Modulation uses a number of different methods described in a number of textbooks. In all these techniques, carrier (which is a high frequency sinusoidal signal) characteristics (either amplitude, frequency, phase or combination of these) are changed in accordance with the data (or information signal) by the modulator and changed back by the demodulator after transmission.

Communication systems that have emerged in recent years include mono-pulse and Ultra-Wide Band communication systems. The problem with these systems is that all monopulse or Ultra-Wide Band communications systems form Power Spectrum Densities that tend to span very wide swaths of the radio spectrum. For instance the FCC has conditionally allowed limited power use of UWB from 3.2 GHz to 10 GHz. These systems must make use of very wide sections of radio spectrum because the transmit power in any narrow section of the spectrum is very low. Generally any 4 KHz section of the affected spectrum will contain no more than −42 dbm of UWB spectral power. Correlating receivers are used to "gather" such very wide spectral power and concentrate it into detectable pulses. Interfering signals are problematic. Since the communication system is receiving energy over a very wide spectrum, any interfering signal in that spectrum must be tolerated and mitigated within the receiver. Many schemes exist to mitigate the interference. Some of these include selective blocking of certain sections of spectrum so as not to hear the interferer, OFDM schemes that send redundant copies of the information in the hope that at least one copy will get through interference, and other more exotic schemes that require sophisticated DSP algorithms to perform advanced filtering. In addition, UWB systems have somewhat of a "bad reputation" because they at least have the potential to cause interference. A heated discourse has gone on for years over the potential that UWB systems can cause interference to legacy spectrum users.

Tri-State Integer Cycle Modulation (TICM) and other Integer Cycle Modulation techniques were invented by Joe Bobier to help alleviate this massive and growing problem which has now become known by its commercial designation, xG Flash Signaling. Its signal characteristics are such that absolute minimal sideband energy is generated during modulation but that its power spectrum density is quite wide relative to the information rate applied. Also, a narrower section of the power spectrum output can be used to represent the same information. The technique of receiver synchronization disclosed herein is primarily applicable to these types of single cycle systems and Ultra Wide Band systems.

In a wireless network using TDMA for multiple access, each user is assigned a time slot for transmission and reception. The receiver in these systems has to acquire and maintain precise synchronization with the transmitter in order to accurately extract the payload data from the received data. The receiver needs to determine symbol timing, carrier frequency offset, and carrier phase offset. The synchronization subsystem in the receiver determines these factors for each received burst of data.

The synchronization subsystem has severe performance constraints in terms of processing time. This in turn places heavy demands on DSP performance and the digital acquisition and data transfer system itself. The amount of time this search takes directly relates to the time slot requirements and the throughput of the receiver.

A traditional TDMA receiver will start sampling data when in its intended timeslot. An entire timeslot's worth of data is presented to the DSP. Every burst of data contains a known sequence of bits that precede the payload data, called the preamble. The synchronization subsystem will start searching for the preamble starting from the very first sample it received. Various methods are used to determine the location of the preamble, such as correlation, MLSE, etc.

The time it takes to process and search through all the samples from the start of the timeslot to the start of the preamble can be called convergence time. The time taken by the digital acquisition system to transfer an entire timeslot's worth of data can be called data transfer time.

The disclosure of this application provides a method, called Symbol Sensed Synchronization (SSS), that significantly reduces the convergence time for synchronization. This method also significantly reduces the transfer time, and the memory required for data storage.

BRIEF SUMMARY OF THE INVENTION

This invention addresses the need to transport high bit-rate data over wired or wireless means using specially modulated radio frequency carrier waves. Specifically, a receiver synchronization technique is described in this disclosure that significantly reduces the convergence time for synchronization further enabling specially modulated radio frequency carrier waves.

In general this method achieves fast synchronization using the following steps: the characteristics of the baseband signal are used to detect the start of the received burst. Once the presence of a symbol is detected, the data acquisition subsystem is enabled to begin collecting samples. These samples are then transferred to the DSP. The DSP then searches for a preamble to precisely determine the timing delay to the start of the payload data.

For a fuller understanding of the nature and objects of the invention, reference should be made to the following detailed description taken in connection with the accompanying drawings.

DESCRIPTION OF THE DRAWINGS

For a fuller understanding of the nature and objects of the invention, reference should be made to the accompanying drawings, in which.

DETAILED DESCRIPTION OF THE INVENTION

Figure 1:
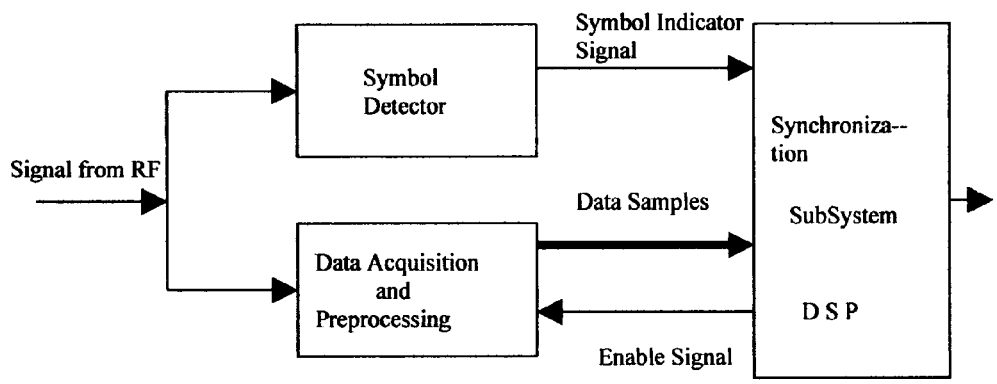
FIG. 1 is a block diagram of a receiver subsystem.

As discussed above this invention addresses the need to transport high bit-rate data over wired or wireless means using specially modulated radio frequency carrier waves. More specifically, a receiver synchronization technique is described that significantly reduces the convergence time for synchronization further enabling specially modulated radio frequency carrier waves.

The system and method of this disclosure achieves fast synchronization using the following steps: the characteristics of the baseband signal are used to detect the start of the received burst. Once the presence of a symbol is detected, the data acquisition subsystem is enabled to begin collecting samples. These samples are then transferred to the DSP. The DSP then searches for a preamble to precisely determine the timing delay to the start of the payload data.

The block diagram of the receiver that implements the Symbol Sensed Synchronization is given below in FIG. 1. In FIG. 2, the sequence of events in one timeslot is shown. The receiver is designed for the xG Flash Signaling modulation and coding technology as described above.

At the start of the receiver's timeslot, denoted by time X in FIG. 2, the signal at the receiver front end is sampled at the sampling frequency. This signal is fed into the Symbol Detector, which then provides a threshold limited signal to the DSP for each sample starting from time X. The actual transmitted burst is not received until time Y in the timeslot. The signal level of each sample denotes the presence or absence of a data symbol.

The DSP will monitor this signal for a change in signal level. Once the DSP detects this change, it will enable the data acquisition subsystem to start data pre-processing, and data transfer to the DSP. The acquisition and pre-processing subsystem now "wakes up" after time A, at time Y in FIG. 2. The incoming data samples from the RF front end are now processed, and the transfer to the DSP is started.

The maximum burst size is known to the DSP. This size is denoted by time B in FIG. 2. The DSP will disable the data acquisition system once it has received all samples for the maximum burst size.

Once all the data is available, the DSP will search for the preamble and determine the timing delay. From here on, it continues with the required processing, such as determining the frequency offset, phase offset, etc.

The major advantages of Symbol Sensed Synchronization are as follows:

1) Reduction in the amount of time taken to transfer received burst data from an entire timeslot's worth to the maximum transmitted burst size.
2) Reduction in the amount of memory required for storage of the received burst data, which in turn reduces the cost of the system.
3) Fast synchronization time due to the fact that the preamble search begins at the start of the transmitted burst, and not at the start of the timeslot.
4) Reduced probability of false preamble detection.
5) Higher data throughput rates from the receiver due to fast synchronization times.
6) Although this method can be used in full duplex and half duplex systems, it is especially useful for one way broadcast transmission systems.
7) Short preambles can be used, increasing the amount of payload data transmitted in one burst.

Figure 2:
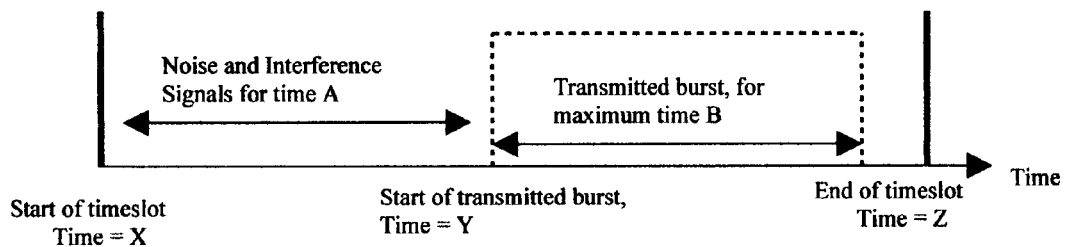
FIG. 2 is a representation of a sequence of events in a receiver timeslot.

A more complete description of the preferred embodiment of the individual blocks shown in FIG. 1 is given below.

Figure 3:
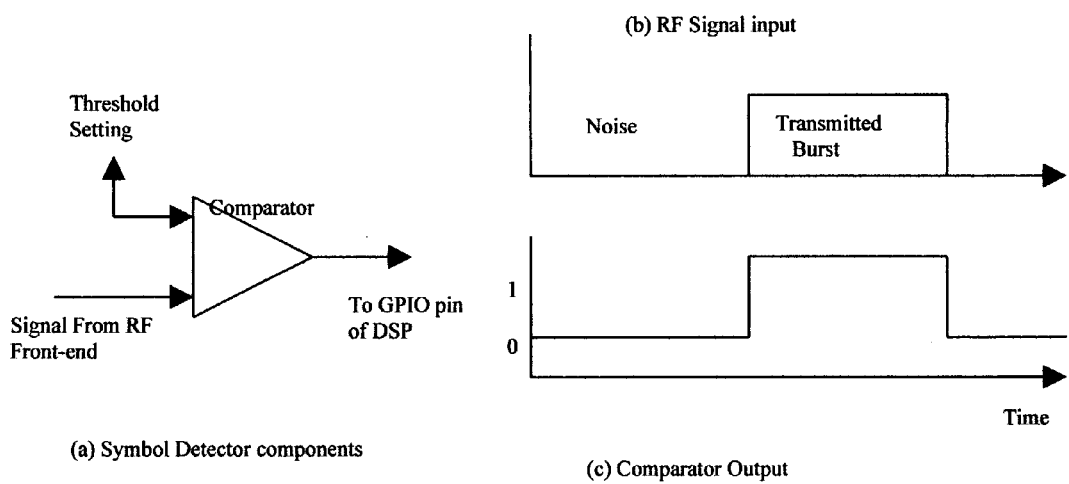
FIG. 3(a) is a representation of the symbol detector subsystem.
FIG. 3(b) is a representation of the RF signal input to the symbol detector subsystem.
FIG. 3(c) is a representation of the output of the symbol detector subsystem.

Symbol Detector Subsystem. This subsystem is a comparator as further shown in FIG. 3(a). The input to this subsystem is the signal from the RF front-end section of the receiver shown in FIG. 3(b). The input is fed into a comparator, which compares this to a threshold setting. Any value of the signal above the threshold results in a logic level 1 at the output of the comparator as shown in FIG. 3(c). Otherwise the comparator output is at logic level 0. The output of the comparator is tied to a general purpose IO pin of the DSP.

Data Acquisition and Pre-processing subsystem. The input to this subsystem is the baseband signal from the RF front-end. This subsystem is in sleep mode until the "enable" signal is provided from the DSP. Once enabled, the input signal is processed and converted to a format acceptable by the DSP. This sampled data is fed into the DSP via a transfer interface. The process of acquisition, preprocessing and transfer continues until a "disable" signal is received from the DSP. This subsystem is easily implemented by one skilled in the art.

Figure 4:
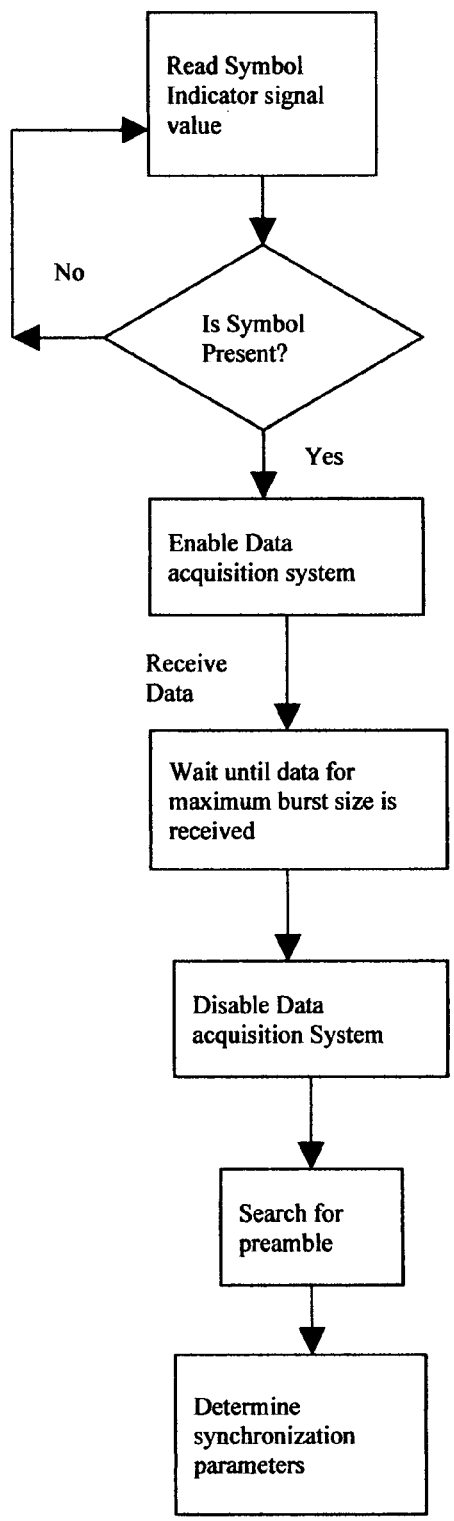
FIG. 4 is a flowchart of a software design to implement the symbol sensed synchronization.

Software Design. The software required to implement the SSS method is illustrated in the flowchart shown in FIG. 4 which can be easily implemented in code by someone skilled in the art.

Although this invention has been described in the form of a preferred embodiment, many modifications, additions, and deletions, may be made thereto without departure from the spirit and scope of the invention, a set forth in the following claims.

What is claimed is:

1. A receiver synchronization method that significantly reduces the convergence time for synchronization of a receiver to a modulated baseband radio frequency signal comprising the following steps:

detecting the start of a modulated baseband radio frequency signal having a known data payload burst size;

then determining the characteristics of said modulated baseband radio frequency signal;

then not collecting or processing samples of preamble and header symbols and instead detecting the presence of a payload data symbol indicating the presence of payload data that is modulated on said modulated baseband radio frequency signal;

only then starting a data acquisition subsystem to begin collecting samples of said modulated baseband radio frequency signal;

next transferring said collected samples of said modulated baseband radio frequency signal to a digital signal processor for processing; and, finally said digital signal processor searching for a preamble on said transferred collected samples of said modulated baseband radio frequency signal and determining a timing delay to the start of said payload data symbol indicating the presence of payload data then stopping the collecting of samples by said data acquisition subsystem at the end of the known data payload burst size.

2. The method of claim 1 wherein the step of detecting the presence of a symbol indicating payload data that is modulated on said modulated baseband radio frequency signal is accomplished by comparing said received modulated baseband radio frequency signal to a threshold level.

3. A receiver synchronization system that significantly reduces the convergence time for synchronization of a receiver to a modulated baseband radio frequency signal comprising:

a detector for detecting the start of a modulated baseband radio frequency signal having a known data payload burst size;

said detector then determining the characteristics of said modulated baseband radio frequency signal;

said detector then not collecting or processing samples of preamble and header symbols and instead detecting the presence of a payload data symbol indicating the presence of payload data that is modulated on said modulated baseband radio frequency signal;

a data acquisition subsystem in communication with said detector wherein said data acquisition subsystem only then begins collecting samples of said modulated baseband radio frequency signal when signaled by said detector;

a digital signal processor in communication with said data acquisition subsystem such that said digital signal processor next receives said collected samples of said modulated baseband radio frequency signal from said data acquisition subsystem for processing; and, said digital signal processor finally searching for a preamble on said received collected samples of said modulated baseband radio frequency signal and determining a timing delay to the start of said payload data symbol indicating the presence of payload data and then stopping the collecting of samples by said data acquisition subsystem at the end of the known data payload burst size.

4. The system of claim 3 wherein said detector which detects the presence of a symbol indicating payload data that is modulated on said modulated baseband radio frequency signal is a comparator which detects the symbol indicating payload data by comparing said received modulated baseband radio frequency signal to a threshold level.

* * * * *